(12) United States Patent
Chen et al.

(10) Patent No.: US 10,126,843 B2
(45) Date of Patent: Nov. 13, 2018

(54) TOUCH CONTROL METHOD AND ELECTRONIC DEVICE

(71) Applicant: Lenovo (Beijing) Co., Ltd., Beijing (CN)

(72) Inventors: Yingbiao Chen, Beijing (CN); Fenglang Li, Beijing (CN); Xiangying Zhang, Beijing (CN); Runsheng Liang, Beijing (CN); Ning Wang, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 176 days.

(21) Appl. No.: 14/752,340

(22) Filed: Jun. 26, 2015

(65) Prior Publication Data

US 2016/0231835 A1 Aug. 11, 2016

(30) Foreign Application Priority Data

Feb. 9, 2015 (CN) .......................... 2015 1 0068032

(51) Int. Cl.
*G06F 3/0354* (2013.01)
*G06F 3/0488* (2013.01)
(Continued)

(52) U.S. Cl.
CPC .......... *G06F 3/03547* (2013.01); *G06F 1/169* (2013.01); *G06F 3/0412* (2013.01);
(Continued)

(58) Field of Classification Search
CPC .......... G06F 3/0412; G06F 3/01; G06F 3/016; G06F 3/017; G06F 3/0488–3/04886
See application file for complete search history.

(56) References Cited

U.S. PATENT DOCUMENTS

2005/0024341 A1\* 2/2005 Gillespie ............... G06F 1/1616
345/173
2009/0058823 A1\* 3/2009 Kocienda .............. G06F 3/0236
345/173
(Continued)

FOREIGN PATENT DOCUMENTS

CN 103189830 A 7/2013
CN 103257820 8/2013
CN 103902183 7/2014

OTHER PUBLICATIONS

First Office Action dated Apr. 5, 2017 (19 pages including English translation) out of Chinese priority Application No. 201510068032.X.

(Continued)

*Primary Examiner* — David Tung
(74) *Attorney, Agent, or Firm* — Brinks Gilson & Lione; John C. Freeman

(57) ABSTRACT

A touch control method is provided, which includes obtaining a first input operation from a first touch-sensitive area of an electronic device; in response to the first input operation, controlling a second touch-sensitive area of the electronic device to switch from a first state to a second state, the first state is a non-operating state, the second state is an operating state; obtaining a second input operation through the second touch-sensitive area in the second state, a starting position of the second input operation is located within the first touch-sensitive area, an operation of the second input operation in the starting position includes the first input operation; and in response to the second input operation, generating an operation instruction corresponding to the second input operation.

13 Claims, 8 Drawing Sheets

(51) Int. Cl.
*G06F 1/16* (2006.01)
*G06F 3/041* (2006.01)

(52) U.S. Cl.
CPC ...... *G06F 3/04883* (2013.01); *G06F 3/04886* (2013.01); *G06F 2203/04808* (2013.01)

(56) References Cited

U.S. PATENT DOCUMENTS

| | | | |
|---|---|---|---|
| 2010/0269040 A1* | 10/2010 | Lee | G06F 3/04817 715/702 |
| 2011/0126100 A1* | 5/2011 | So | G06F 3/041 715/705 |
| 2011/0316797 A1* | 12/2011 | Johansson | G06F 3/04883 345/173 |
| 2012/0071149 A1* | 3/2012 | Bandyopadhyay | G06F 1/1643 455/418 |
| 2012/0174042 A1* | 7/2012 | Chang | G06F 3/0488 715/863 |
| 2012/0223890 A1* | 9/2012 | Borovsky | G06F 3/04883 345/173 |
| 2013/0069903 A1* | 3/2013 | Geiger | G06F 3/0488 345/174 |
| 2013/0162571 A1* | 6/2013 | Tamegai | G06F 3/0412 345/173 |

OTHER PUBLICATIONS

Second Office Action dated Oct. 10, 2017 (19 pages including English translation) from Chinese priority Application No. 201510068032.X.

* cited by examiner

TOUCH CONTROL METHOD AND ELECTRONIC DEVICE

This application claims priority to Chinese Patent Application No. 201510068032.X filed on Feb. 9, 2015; the entire contents of which are incorporated herein by reference.

The present application relates to the field of touch control technique, and more particularly, to a touch control method and an electronic device.

BACKGROUND

At present, a notebook computer is generally provided with a touch panel, which can detect touch gestures of user's finger thereon and send relevant instructions to the notebook computer. In the prior art, in order to avoid mistakenly touching the touch panel when operating the keyboard, the user usually closes the touch panel's function when operating the keyboard, for example, pressing a corresponding key combination on the keyboard to close the touch panel, pressing the corresponding key combination on the keyboard to open the touch panel's function when needing to use the touch panel. If the user needs to frequently switch between the touch panel and keyboard, he/she needs to repeatedly press the corresponding key combination on the keyboard to open and close the touch panel's function, the operation is too complicated, and will greatly reduce using efficiency of the user.

SUMMARY

In an aspect, an embodiment of the present application provides a touch control method, which includes: obtaining a first input operation from a first touch-sensitive area of an electronic device; in response to the first input operation, controlling a second touch-sensitive area of the electronic device to switch from a first state to a second state; the first state being a non-operating state, the second state being an operating state; obtaining a second input operation through the second touch-sensitive area in the second state; a starting position of the second input operation being located within the first touch-sensitive area, an operation of the second input operation in the starting position comprising the first input operation; and in response to the second input operation, generating an operation instruction corresponding to the second input operation.

In an embodiment of the present disclosure, obtaining the first input operation from the first touch-sensitive area of the electronic device includes: when a first portion of a touch sensing array of a touch sensor of the electronic device is in an operating state and a second portion thereof is in the first state, obtaining the first input operation through the first portion of the touch sensing array of the touch sensor in the operating state; the first touch-sensitive area and the second touch-sensitive area are corresponding to the touch sensing array of the touch sensor, the first touch-sensitive area corresponding to the first portion of the touch sensing array, the second touch-sensitive area corresponding to the second portion of the touch sensing array; controlling the second touch-sensitive area of the electronic device to switch from the first state to the second state includes: controlling the second portion of the touch sensing array of the touch sensor to switch from the first state to the second state.

In an embodiment of the present disclosure, obtaining the first input operation from the first touch-sensitive area of the electronic device includes: when a first sensor of the electronic device is in an operating state and the touch sensor of the electronic device is in the first state, obtaining the first input operation by the first sensor in the operating state; the first touch-sensitive area corresponding to a sensitive area of the first sensor, and the second touch-sensitive area corresponding to a sensitive area of the touch sensor;

controlling the second touch-sensitive area of the electronic device to switch from the first state to the second state includes: controlling the touch sensor to switch from the first state to the second state, and controlling the first sensor to switch from the operating state to the non-operating state.

In an embodiment of the present disclosure, the first input operation and the second input operation are different input portions of a single input operation.

In an embodiment of the present disclosure, the first touch-sensitive area is an area first contacted by an operator when inputting the single input operation.

In an embodiment of the present disclosure, generating the operation instruction corresponding to the second input operation includes: generating a movement command for moving a cursor on a display screen of the electronic device in real time according to an operation trajectory of the second input operation; and controlling movement of the cursor on the display screen based on the movement command.

In another aspect, an embodiment of the present application further provides an electronic device, including: a housing having a touch-sensitive area for touch input; a processor configured to: obtain a first input operation from a first touch-sensitive area of the touch-sensitive area; in response to the first input operation, control a second touch-sensitive area of the touch-sensitive area to switch from a first state to a second state; obtain a second input operation through the second touch-sensitive area in the second state; and in response to the second input operation, generate an operation instruction corresponding to the second input operation. A starting position of the second input operation is located within the first touch-sensitive area, an operation of the second input operation in the starting position includes the first input operation; the first state is a non-operating state; the second state is an operating state.

In an embodiment of the present disclosure, the electronic device further includes: a first touch sensor having a touch sensing array which is corresponding to the touch-sensitive area of the housing; the first touch-sensitive area corresponding to a first portion of the touch sensing array, and the second touch-sensitive area corresponding to a second portion of the touch sensing array; the processor is coupled with the first touch sensor and configured to: when the first portion of the touch sensing array is in an operating state and the second portion thereof is in the first state, obtain the first input operation through the first portion of the touch sensing array of the first touch sensor; and in response to the first input operation, controlling the second portion of the touch sensing array to switch from the first state to the second state.

In an embodiment of the present disclosure, the electronic device further includes: a first sensor having a sensing area corresponding to the first touch-sensitive area; a second touch sensor having a sensing area corresponding to the second touch-sensitive area; the processor is coupled with the first sensor and the second touch sensor respectively, for the processor is further configured to: when the first sensor is in an operating state and the second touch sensor is in the first state, obtain the first input operation by the first sensor in the operating state; control the second touch sensor to switch from the first state to the second state, and control the first sensor to switch from the operating state to the non-operating state.

In an embodiment of the present disclosure, the second touch-sensitive area surrounds the first touch-sensitive area.

In an embodiment of the present disclosure, the electronic device further includes a keyboard having a keyboard input area; the keyboard input area and the touch-sensitive area are located on a same surface of the housing.

In an embodiment of the present disclosure, the first touch-sensitive area of the touch sensitive area is an area not contacted by an input gesture during inputting through the keyboard input area.

In an embodiment of the present disclosure, the electronic device further includes a display screen; the processor is further configured to: generate a movement command for moving a cursor in real time according to an operation trajectory of the second input operation; and control movement of the cursor on the display screen based on the movement command.

DETAILED DESCRIPTION

To further illustrate the technical measures adopted by the present application to achieve the intended objects and the technical effects thereof, hereinafter, modes, structures, features, and effects according to the specific embodiments of the present application will be described in detail below. In the following description, different "an embodiment" or "embodiment" may not necessarily refer to the same embodiment. In addition, specific features, structures, or characteristics in one or more embodiments may be combined in any suitable forms.

As shown in FIGS. 1 to 5, a first embodiment of the present application provides a touch control method, comprising:

obtaining a first input operation from a first touch-sensitive area 21 of an electronic device;

in response to the first input operation, controlling a second touch-sensitive area 22 of the electronic device to switch from a first state to a second state; the first state being a non-operating state, the second state being an operating state; in other words, in response to the first input operation, controlling a second touch-sensitive area 22 of the electronic device to switch from a non-operating state to an operating state;

obtaining a second input operation through the second touch-sensitive area 22 in the second state; and in response to the second input operation, generating an operation instruction corresponding to the second input operation.

Figure 1:
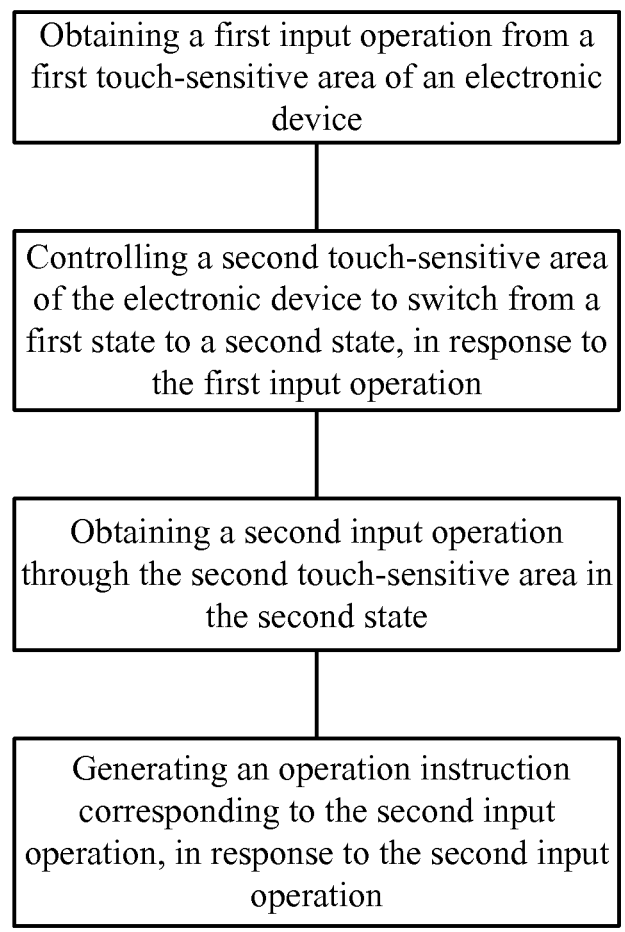
FIG. 1 is a structural block diagram of a touch control method provided by a first embodiment of the present application.
Figure 2:
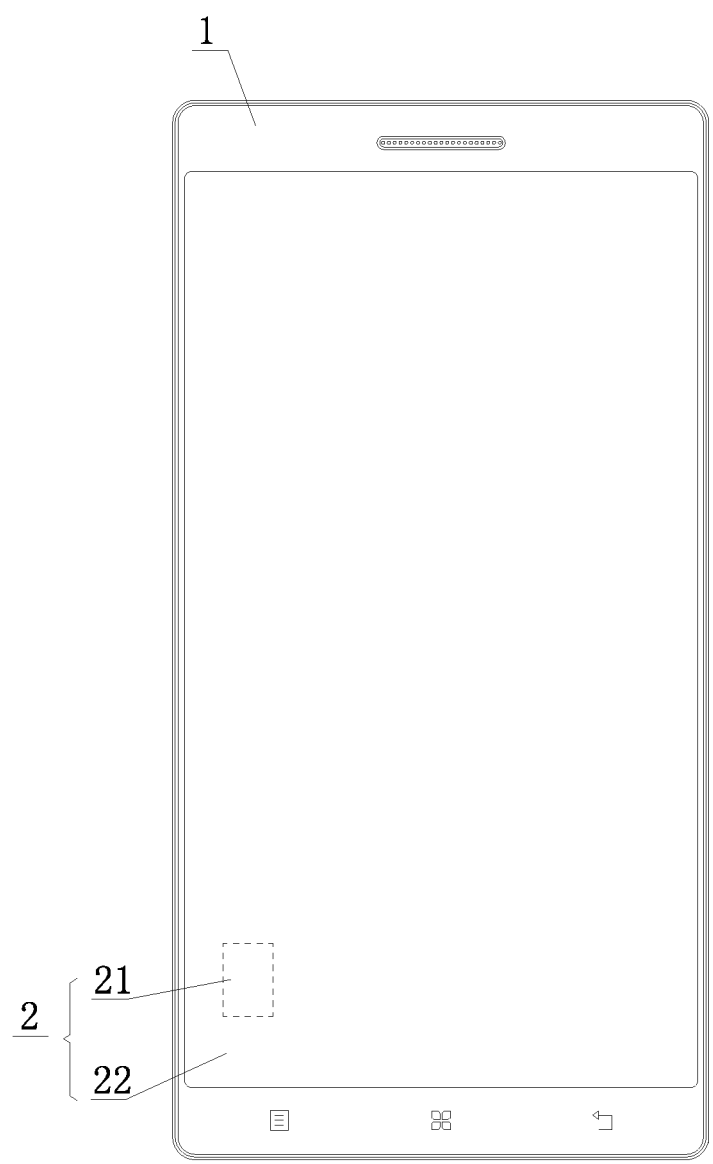
FIG. 2 is a structural schematic diagram of an electronic device which is a mobile phone and in a first state provided by a second embodiment of the present application.
Figure 5:
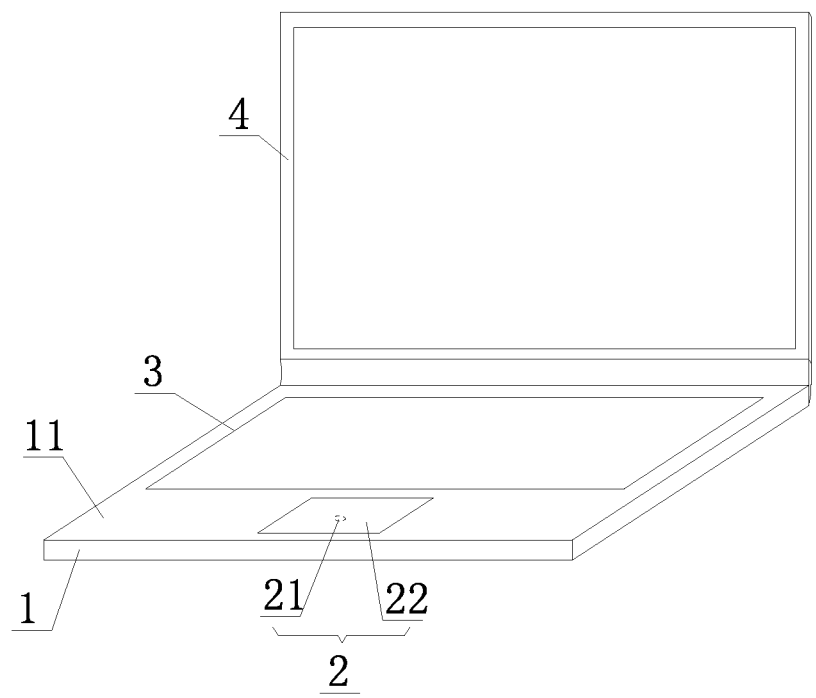
FIG. 5 a structural schematic diagram of an electronic device which is a notebook computer provided by the second embodiment of the present application.

The first touch-sensitive area 21 and the second touch-sensitive area 22 mentioned above in common constitute a touch-sensitive area 2 of the electronic device. For example, the first touch-sensitive area 21 and the second touch-sensitive area 22 may in common constitute a touch surface (as shown in FIG. 5) of a touch panel of a notebook computer; or the first touch-sensitive area 21 and the second touch-sensitive area 22 may in common constitute a touch surface of a touch panel of a tablet computer; or the first touch-sensitive area 21 and the second touch-sensitive area 22 may in common constitute a touch surface (as shown in FIG. 2) of a touch panel of a mobile phone, and so on, wherein it is possible to set in particular according to practical needs of the user. In this embodiment, a starting position of the second input operation is located within the first touch-sensitive area 21, the starting position of the second input operation located within the first touch-sensitive area 21 is regarded as the first input operation. In other words, when the user starts to perform a second input operation with the first touch-sensitive area 21 being regarded as the starting position, it also completes the first input operation on the first touch-sensitive area 21. Between such time internal from when the user performs a second input operation with the first touch-sensitive area 21 being regarded as the starting position and prior to moving to the second touch-sensitive area 22, the second touch-sensitive area 22 has already been switched from the non-operating state to the operating state in response to the first input operation, when user's finger continues moving to the second touch-sensitive area 22, the second touch-sensitive area 22 can be operated normally. The entire process that user's finger slides from the first touch-sensitive area 21 to the second touch-sensitive area 22 and performs the second input operation is a coherent action, the user only needs to regard the first touch-sensitive area 21 as the starting position of an operating gesture, which thereby will not affect a normal input operation of the user.

In the technical solutions provided by the embodiment of the present application, when the user does not need to operate the touch-sensitive area 2 of the electronic device, only the first touch-sensitive area 21 on the touch-sensitive area 2 is in the operating state, the second touch-sensitive area 22 on the touch-sensitive area 2 other than the first touch-sensitive area 21 is in the non-operating state, thereby energy is saved; and a proportion of the first touch-sensitive area 21 can be made as relatively small, thereby a probability that the user mistakenly operates the first touch-sensitive area 21 when operating the electronic device can be reduced. When the user needs to operate the touch-sensitive area 2 of the electronic device, the user only needs to regard the first touch-sensitive areas 21 as the starting position of an operating gesture, that is, it is possible to make the second touch-sensitive area 22 rapidly switch from the non-operating state to the operating state, the operating gesture of the user from the first touch-sensitive area 21 to the second touch-sensitive area 22 is a coherent action, which will not affect a normal input operation of the user, in comparison to the prior art, in which the user needs to operate the complicated key combination on the keyboard so as to open the touch-sensitive area 2 of the electronic device, in this embodiment, the user only needs to regard the first touch-sensitive area 21 as the starting position of the operating gesture, it is more convenient for the user to operate, operating efficiency is higher, and it tallies with using habit of the user, the user can have better using experience.

Figure 6:
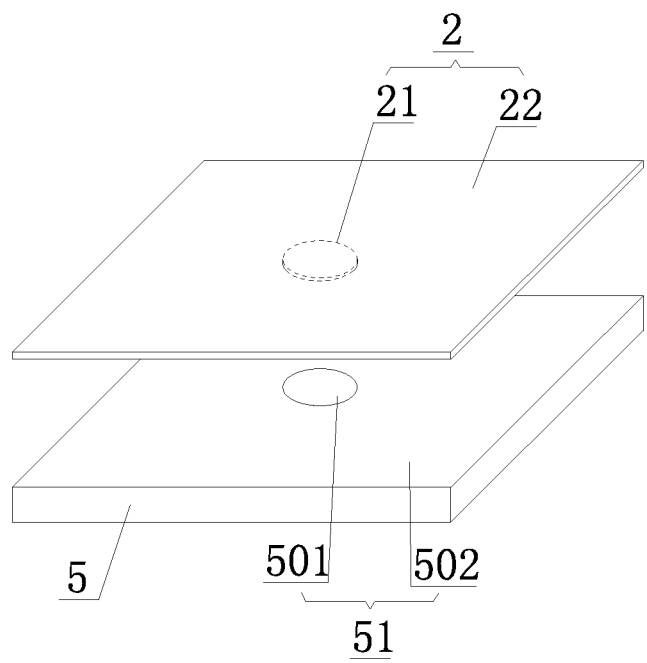
FIG. 6 is a positional relationship diagram of a touch sensing array of a first touch sensor and a touch-sensitive area provided by the second embodiment of the present application.

Based on the above description, during an implementation in particular, as shown in FIG. 6, the first touch-sensitive area 21 and the second touch-sensitive area 22 in the above embodiment may correspond to two different portions of a single touch sensor; or alternatively, the first touch-sensitive area 21 may correspond to a sensitive area of a non-touch sensor like a print sensor or a pressure sensor, and the second touch-sensitive area 22 may correspond to a sensitive area of a touch sensor. In particular, the embodiment of the present application makes no concrete limitation thereto, only if it is ensured that the second touch-sensitive area 22 can be controlled to switch from the non-operating state to the operating state in response to the first input operation on the first touch-sensitive area 21. For example, there are several specific implementations as provided below.

First, FIG. 6 shows an implementation in which the first touch-sensitive area 21 and the second touch-sensitive area 22 correspond to two different portions of a single touch sensor, respectively. As shown in FIG. 6, obtaining the first input operation from the first touch-sensitive area 21 of the electronic device mentioned above comprises:

when a first portion 501 of a touch sensing array 51 of a touch sensor 5 of the electronic device is in an operating state and a second portion 502 thereof is in the first state, obtaining the first input operation through the first portion 501 of the touch sensing array 51 of the touch sensor in the operating state, wherein the first touch-sensitive area 21 and the second touch-sensitive area 22 in common correspond to the touch sensing array 51 of the touch sensor, in particular, the first touch-sensitive area 21 corresponds to the first portion 501 of the touch sensing array 51, the second touch-sensitive area 22 corresponds to the second portion 502 of the touch sensing array 51. In this example, the first touch-sensitive area 21 and the second touch-sensitive area 22 both correspond to the touch sensing array 51 of the touch sensor.

Controlling the second touch-sensitive area 22 of the electronic device to switch from the first state to the second state comprises: controlling the second portion 502 of the touch sensing array 51 of the touch sensor to switch from the first state to the second state. Since the second touch-sensitive area 22 corresponds to the second portion 502 of the touch sensing array 51, the operating status of the second touch-sensitive area 22 is consistent with the second portion 502. When the second portion 502 is in the operating state, the second touch-sensitive area 22 is also in the operating state; when the second portion 502 is in the non-operating state, the second touch-sensitive area 22 is also in the non-operating state. Accordingly, when the second portion 502 of the touch sensing array 51 is switched from the first state to the second state, the second touch-sensitive area 22 is also switched from the first state to the second state.

Figure 7:
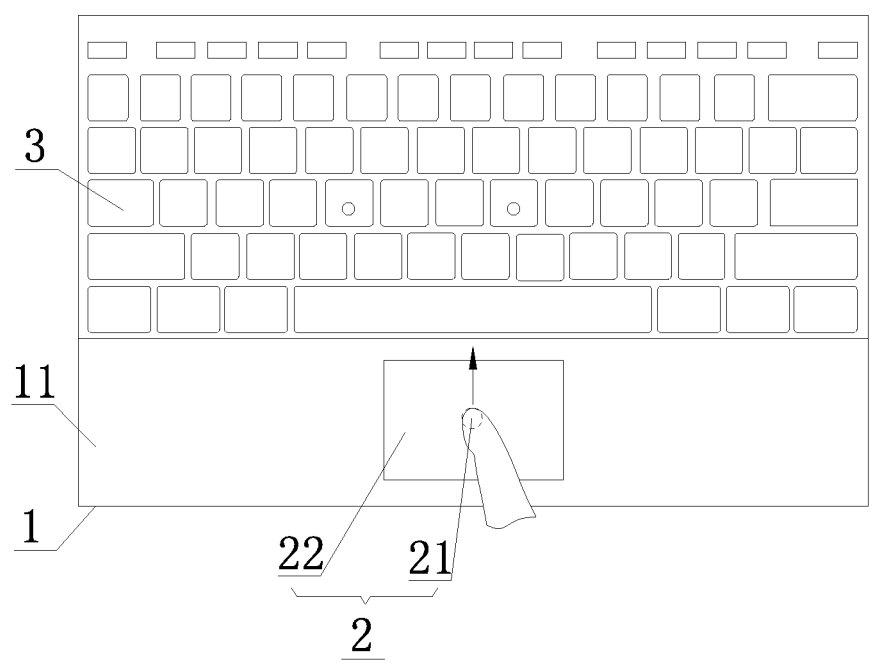
FIG. 7 is a structural schematic diagram when a finger slides on a touch-sensitive area of the notebook computer provided by the second embodiment of the present application.
Figure 8:
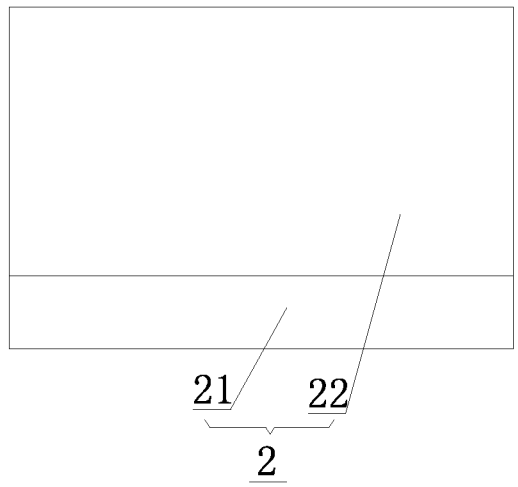
FIG. 8 is a diagram of relative positional relationship between a first touch-sensitive area and a second touch-sensitive area provided by the second embodiment of the present application.

In the case of implementing the above example in particular, when controlling the second portion 502 of the touch sensing array 51 of the touch sensor to switch from the first state to the second state, it is possible to maintain the first portion 501 of the touch sensing array 51 of the touch sensor in the operating state, which brings the technical effect to make the entire touch-sensitive area 2 (the first touch-sensitive area 21 and the second touch-sensitive area 22) be in the operating state. For example, when the touch control method in this example is applied to a notebook computer, the first touch-sensitive area 21 and the second touch-sensitive area 22 may correspond to two different areas of a touch surface of a touch panel of the notebook computer, respectively, when the first touch-sensitive area 21 is triggered, it is possible to trigger the second touch-sensitive area 22, and maintain the first touch-sensitive area 21 in the operating state, in this way, the whole touch panel of the notebook computer is in the operating state, so as to facilitate user operating. However, in another implementation of the above example, when controlling the second portion 502 of the touch sensing array 51 of the touch sensor to switch from the first state to the second state, the first portion 501 of the touch sensing array 51 of the touch sensor is switched from the operating state to the non-operating state. In other words, at the beginning, the first portion 501 of the touch sensing array 51 is in the operating state, the second portion 502 of the touch sensing array 51 is in the non-operating state; when the user triggers the first touch-sensitive area 21, the second portion 502 of the touch sensing array 51 is switched from the non-operating state to the operating state, meanwhile the first portion 501 of the touch sensing array 51 is switched from the operating state to the non-operating state. In said another implementation of the above example, the working states of the first portion 501 of the touch sensing array 51 and the second portion 502 of the touch sensing array 51 are exactly opposite. For that the second input operation of the user on the second touch-sensitive area 22 can generate a coherent response, the second portion 502 of the touch sensing array 51 may be used to compensate for deficiency caused by that the first portion 501 is in the non-operating state. For example, as shown in FIG. 7, when the touch control method of this example is applied to a notebook computer, the first touch-sensitive area 21 and the second touch-sensitive area 22 may correspond to two different areas of a touch surface of a touch panel of the notebook computer, respectively, when user's finger is sliding linearly on the second touch-sensitive area 22, in response to this linear sliding, a continuous movement of the cursor will be presented on a display screen 4 of the notebook computer; if the first touch-sensitive area 21 is located in a middle position of the linear path and in the non-operating state, when user's finger still slides by following the same linear track, the second portion 502 of the touch sensing array 51 of the notebook computer will compensate for deficiency of the first touch-sensitive area 21, so that a continuous movement of the cursor will be still presented on the notebook computer, just like the first portion 501 and the first touch-sensitive area 21 still are in the operating state, sensorially, the user will not feel a pause during movement of the cursor.

It should be added that, the first touch-sensitive area 21 and the second touch-sensitive area 22 in the above example may correspond to two different touch sensors, respectively, that is, the first touch-sensitive area 21 may correspond to a sensitive area of one touch sensor, and the second touch-sensitive area 22 may correspond to a sensitive area of another touch sensor. As for specific work process thereof, the description in the above example may be referred, no more details repeated here.

Second, in another example, the first touch-sensitive area 21 mentioned above may correspond to a sensitive area of a non-touch sensor like a print sensor or a pressure sensor, and the second touch-sensitive area 22 mentioned above may correspond to a sensitive area of a touch sensor. In this another example, obtaining the first input operation from the first touch-sensitive area 21 of the electronic device mentioned above comprises: when a first sensor of the electronic device is in an operating state and the touch sensor of the electronic device is in the first state, obtaining the first input operation by the first sensor in the operating state; the first touch-sensitive area 21 corresponding to a sensitive area of the first sensor, and the second touch-sensitive area 22 corresponding to a sensitive area of the touch sensor. Controlling the second touch-sensitive area of the electronic device to switch from the first state to the second state comprises: controlling the touch sensor to switch from the first state to the second state, and controlling the first sensor to switch from the operating state to the non-operating state. In this example, the first sensor may be a print sensor or a pressure sensor, for example, when the first sensor is a print sensor, a print identification module within the electronic device may be used to identify an ID of a user, only when a user that satisfies a print requirement touches the first sensor, it can trigger a first input operation on the first sensor, and therefore, in response to the first input operation, the second touch-sensitive area 22 can be switched from the non-operating state to the operating state. In order to not affect the normal operation of the user, after the second touch-sensitive area 22 is switched from the non-operating state to the operating state, the print sensor is switched from the operating state to the non-operating state, so that the user can operate at will on the second touch-sensitive area 22, without being affected by the print sensor. For that the second input operation of the user on the second touch-sensitive area 22 can generate a coherent response, a touch sensor may be used to compensate for deficiency caused by that the print sensor is in the non-operating state. As for the specific compensation method, the related description that the second portion 502 of the sensing array 51 is used to compensate for the first portion 501 as provided above can be referred, no more details repeated here. Likewise, the first sensor mentioned above may be a pressure sensor and so on, only a predetermined pressure is applied to the pressure sensor can complete the first input operation. The present application makes no limitation to the type of the first sensor, it may be set according to practical needs of the user.

During an implementation in particular, the first input operation and the second input operation mentioned above may be different input portions of a single input operation. The first input operation and the second input operation both are a single coherent input operation, this coherent input operation can effectuate two responses, that is, the response corresponding to the first input operation and the response corresponding to the second input operation. For example, as shown in FIG. 7, when the touch control method in this example is applied to a notebook computer, the first touch-sensitive area 21 and the second touch-sensitive area 22 may correspond to two different areas of a touch surface of a touch panel of the notebook computer, respectively, when user's finger is sliding linearly from the first touch-sensitive area 21 through the second touch-sensitive area 22, in response to this linear sliding, a continuous movement of the cursor will be presented on a display screen 4 of the notebook computer. As for this linear sliding, sensorially, it is a single input operation for the user, but actually, a single operation of this linear sliding includes two portions: one is the first input operation in which user's finger regards the first touch-sensitive area 21 as the starting position, and the other is the second input operation in which user's finger continues to slide through the second touch-sensitive area 22.

In addition, the first touch-sensitive area 21 mentioned above is an area that an operator contacts first when a user of the electronic device uses the touch-sensitive area 2 to input the single input operation. In other words, every time the user needs to operate the above single input operation, it always needs to regard the first touch-sensitive area 21 as the starting position. For example, as shown in FIG. 7, when the touch control method in this example is applied to a notebook computer, the first touch-sensitive area 21 and the second touch-sensitive area 22 may correspond to two different areas of a touch surface of a touch panel of the notebook computer, respectively, the single input operation mentioned above may refer to the operation of moving a cursor or making a scrolling input on the display screen, that is, every time the user needs to move the cursor or make a scrolling input on the display screen, it always needs to regard the first touch-sensitive area 21 as the starting position to operate. Of course, in an alternative embodiment, it is also possible to operate from the first touch-sensitive area 21, only during the first time when the second touch-sensitive area 22 is in the non-operating state, after the second touch-sensitive area 22 is switched from the non-operating state to the operating state, if continues to make a touch input, there is no need to operate starting from the first touch-sensitive area. The present application makes no limitations thereto, it may be set specifically according to practical needs of the user.

Based on the above description, in addition, generating the operation instruction corresponding to the second input operation mentioned above comprises: generating a movement command for moving a cursor on a display screen 4 of the electronic device in real time according to an operation trajectory of the second input operation; and controlling movement of the cursor on the display screen 4 based on the movement command. Of course, in an alternative embodiment, generating the operation instruction corresponding to the second input operation mentioned above comprises: generating a scrolling command in real time according to an operation trajectory of the second input operation; and controlling a display list on the display screen 4 to scroll based on the scrolling command.

As shown in FIGS. 2 and 5, a second embodiment of the present application further provides an electronic device comprising a housing 1 and a processor (not shown). The housing 1 has a touch-sensitive area 2 thereon for an operator like a finger and so on to make a touch input. The processor is provided within the housing and for obtaining a first input operation from a first touch-sensitive area 21 of the touch-sensitive area 2; in response to the first input operation, controlling a second touch-sensitive area 22 of the touch-sensitive area 2 to switch from a first state to a second state; obtaining a second input operation through the second touch-sensitive area 22 in the second state; and in response to the second input operation, generating an operation instruction corresponding to the second input operation, wherein:

a starting position of the second input operation is located within the first touch-sensitive area 21, the starting position of the second input operation located within the first touch-sensitive area 21 is regarded as the first input operation;

the first touch-sensitive area 21 and the second touch-sensitive area 22 in common constitute the touch-sensitive area 2 of the electronic device; the first state is a non-operating state; the second state is an operating state.

It should be noted that, as for the specific control method of the processor in the electronic device of the second embodiment, related description in the touch control method described above in the first embodiment may be referred, no more details repeated here.

In an implementation in particular, the electronic device in the second embodiment may be a notebook computer, a tablet computer, or a mobile phone and so on. The present application makes no limitations thereto, only if it is ensured that the processor of the electronic device can implement the above touch control method. For example, there are several specific implementations as provided below.

Figure 3:
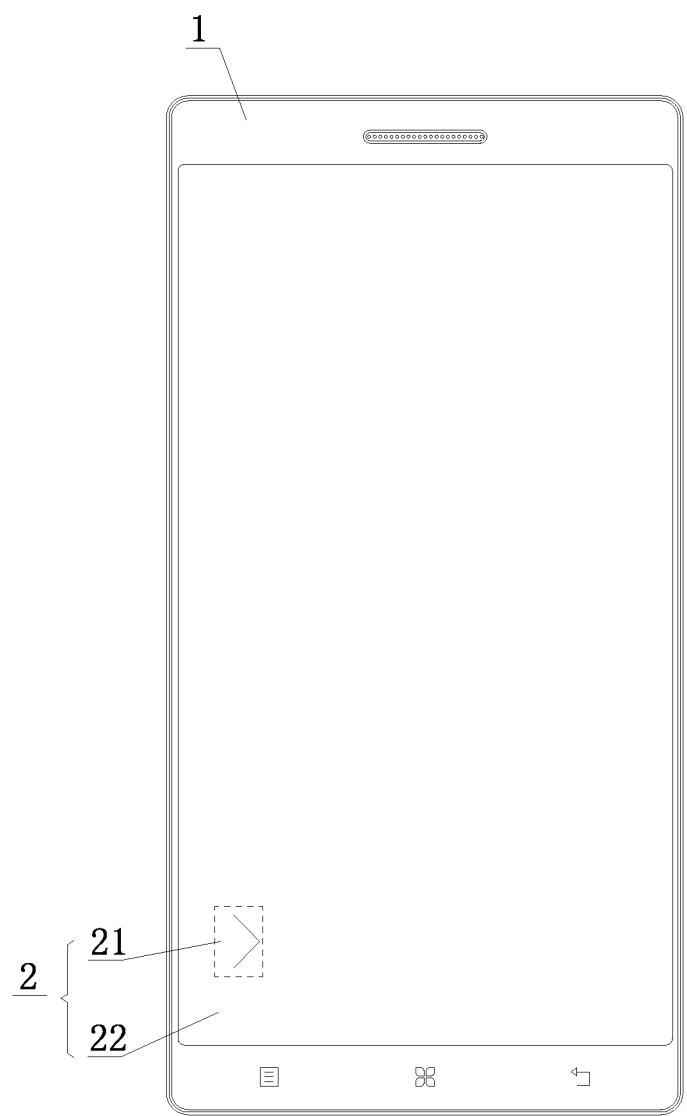
FIG. 3 is a structural schematic diagram of an electronic device which is a mobile phone and in a second state provided by the second embodiment of the present application.
Figure 4:
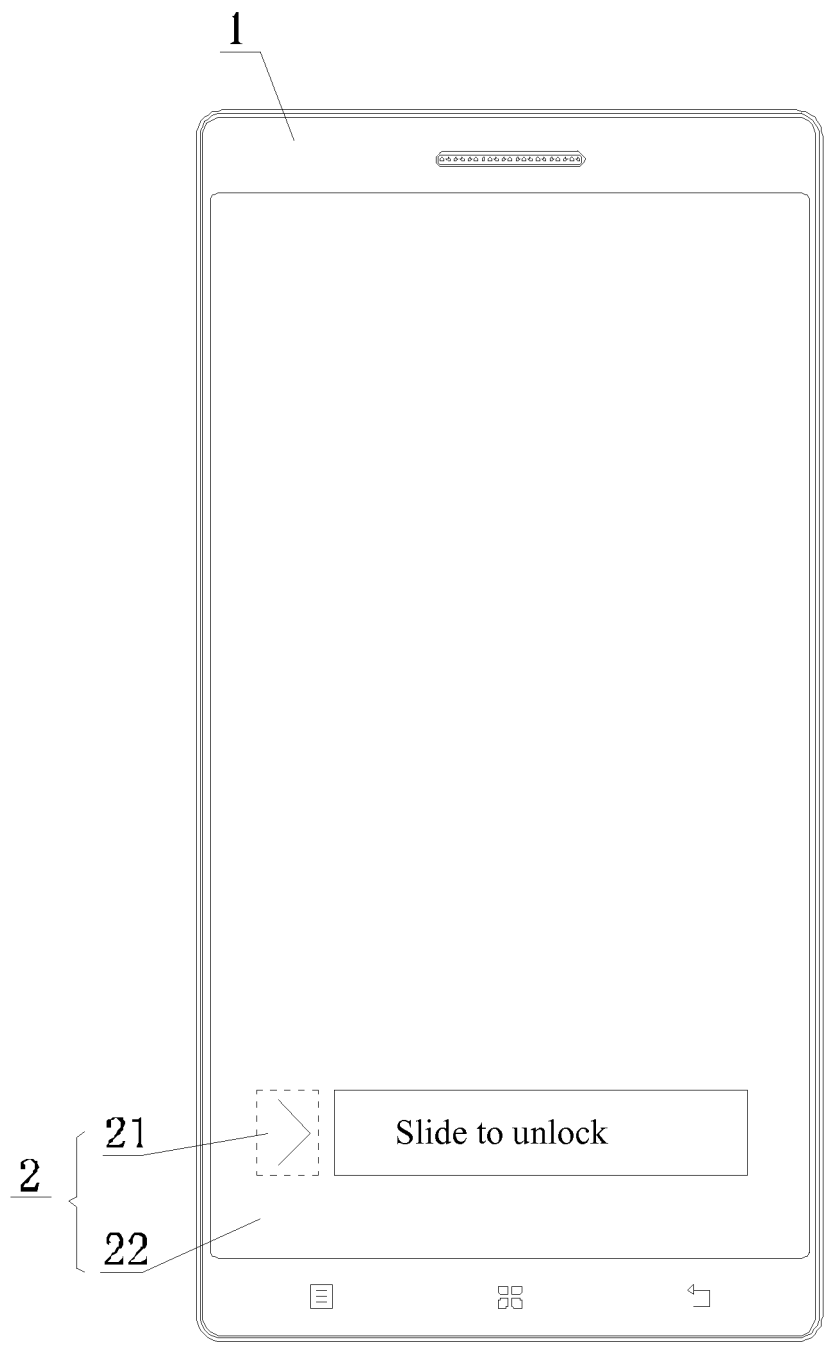
FIG. 4 is a structural schematic diagram of an electronic device which is a mobile phone and in a third state provided by the second embodiment of the present application.

First, as shown in FIG. 2, when the electronic device in the second embodiment of the present application is a mobile phone, the first touch-sensitive area 21 and the second touch-sensitive area 22 may be two different areas of a touch display screen of the mobile phone, respectively, and constitute an entire touch surface of the touch display screen of the mobile phone. In this example, a proportion of the first touch-sensitive area 21 can be made as relatively small, thereby a probability that the user mistakenly touches the first touch-sensitive area 21 when the mobile phone in this example is in a trouser pocket or a bag. When the user needs to operate the touch display screen, he/she only needs to slide from the first touch-sensitive area 21 to the second touch-sensitive area 22, which can implement two responses of lightening the entire touch display screen and unlocking. In particular, FIG. 2 shows a structural schematic diagram in which the display screen of the mobile phone is in a black screen state, in which state only the first touch-sensitive area 21 is in the operating state, the second touch-sensitive area 22 on the touch-sensitive area 2 other than the first touch-sensitive area 21 is in the non-operating state. When user's finger touches the first touch-sensitive area 21, as shown in FIG. 3, in response to this touch action, the mobile phone controls the second touch-sensitive area 22 to switch from the non-operating state to the operating state, thus lightening the entire display screen, that is, the first touch-sensitive area 21 and the second touch-sensitive area 22 both are enlightened. In order to help and guide the user to unlock, as shown in FIG. 4, the position of the first touch-sensitive area 21 will shows an indication of an arrow, which has a technical effect of indicating the user to slide in accordance with the direction of the arrow, meanwhile at the other side of the arrow characters "slide to unlock" and a slideway are shown to guide user's finger to slide along the slideway of "slide to unlock", wherein user's finger touches the first touch-sensitive area 21 and slides along the predetermined slideway, this entire process is a coherent action, in comparison to the prior art in which the user needs to first press a power key to lighten the entire touch display screen and then slide to unlock, the mobile phone of this embodiment saves an action of pressing the power key during the operation, and thereby simplifies the operation process, and achieves higher efficiency. Likewise, when the electronic device of the second embodiment is a tablet computer, as for its specific operation process, description related to the mobile phone can be referred, no more details repeated here.

Second, as shown in FIG. 5, when the electronic device in the second embodiment of the present application is a notebook computer, the first touch-sensitive area 21 and the second touch-sensitive area 22 may be two different areas of a touch surface of a touch panel of the notebook computer, respectively, and constitute an entire touch surface of the touch panel of the notebook computer. The first touch-sensitive area 21 may be set at a central position of the touch surface of the touch panel, and surrounded by the second touch-sensitive area 22, in this way, it is more tallied with using habit of the user. When the user does not need to operate the touch panel, only the first touch-sensitive area 21 on the touch panel is in the operating state, the second touch-sensitive area on the touch panel other than the first touch-sensitive area 21 is in the non-operating state; when needs to operate the touch panel, the user only needs to regard the first touch-sensitive area as the starting position of the operating gesture, and then can perform the second input operation, the whole process is a coherent action, the touch panel can be enabled without the complicated key combination on the keyboard and so on, operating efficiency is higher, it is more convenient for the user to use.

As will be appreciated by those skilled in the art, the above notebook computer, tablet computer or mobile phone merely are examples, not used to limit the technical solutions of this embodiment, other types of electronic device may also be applicable.

Based on the above description, during an implementation in particular, as shown in FIG. 6, the first touch-sensitive area 21 and the second touch-sensitive area 22 in the second embodiment may correspond to two different portions of a single touch sensor; or alternatively, the first touch-sensitive area 21 may correspond to a sensitive area of a non-touch sensor like a print sensor or a pressure sensor, and the second touch-sensitive area 22 may correspond to a sensitive area of a touch sensor. In particular, the second embodiment of the present application makes no concrete limitation thereto, only if it is ensured that the second touch-sensitive area 22 can be controlled to switch from the non-operating state to the operating state in response to the first input operation on the first touch-sensitive area 21. For example, there are several specific implementations as provided below.

First, FIG. 6 shows an implementation in which the first touch-sensitive area 21 and the second touch-sensitive area 22 correspond to two different portions of a single touch sensor, respectively. As shown in FIG. 6, the electronic device provided in the second embodiment may further comprise a first touch sensor 5 provided within the housing 1 and having a touch sensing array 51; the touch sensing array 51 corresponding to the touch-sensitive area on the housing 1. In particular, the first touch-sensitive area 21 mentioned above corresponds to a first portion 501 of the touch sensing array 51, and the second touch-sensitive area 22 mentioned above corresponds to a second portion 502 of the touch sensing array 51.

The processor mentioned above is connected with the first touch sensor 5 and is specifically for when the first portion 501 of the touch sensing array 51 is in an operating state and the second portion 502 thereof is in the first state, i.e., the non-operating state, obtaining the first input operation through the first portion 501 of the touch sensing array 51 of the first touch sensor 5 in the operating state; and in response to the first input operation, controlling the second portion 502 of the touch sensing array 51 to switch from the first state to the second state, i.e., switching from the non-operating state to the operating state.

It should be added that, the first touch-sensitive area 21 and the second touch-sensitive area 22 in the above example may also correspond to two different touch sensors, respectively, that is, the first touch-sensitive area 21 may correspond to a sensitive area of one touch sensor, and the second touch-sensitive area 22 may correspond to a sensitive area of another touch sensor. As for specific working process, the description in the above example may be referred, no more details repeated here.

As for the specific control method of the processor in this example, related description in the touch control method described above in the first embodiment may be referred, no more details repeated here.

Second, in another example of the second embodiment, the first touch-sensitive area 21 may correspond to a sensitive area of a non-touch sensor like a print sensor or a pressure sensor, and the second touch-sensitive area 22 may correspond to a sensitive area of a touch sensor. In particular, the electronic device provided by the second embodiment may comprise a first sensor (not shown) and a second touch sensor (not shown). The first sensor may be a print sensor or a pressure sensor and so on. A sensing area of the first sensor corresponds to the first touch-sensitive area 21; a sensing area of the second touch sensor corresponds to the second touch-sensitive area 22. The processor mentioned above is connected with the first sensor and the second touch sensor respectively, and is specifically for when the first sensor is in an operating state and the second touch sensor is in the first state, obtaining the first input operation by the first sensor in the operating state; and controlling the second touch sensor to switch from the first state to the second state, i.e., switching from the non-operating state to the operating state, and controlling the first sensor to switch from the operating state to the non-operating state.

As for the specific control method of the processor in this example, related description in the touch control method described above in the first embodiment may be referred, no more details repeated here.

Based on the above description, in the electronic device provided by the second embodiment, the second touch-sensitive area 22 may surround the first touch-sensitive area 21. For example, when the electronic device provided by the second embodiment is a notebook computer, the first touch-sensitive area 21 may be set in a middle area (as shown in FIG. 5) of the touch surface of the touch panel of the notebook computer; or alternatively, when the electronic device provided by the second embodiment is a tablet computer or a mobile phone, the first touch-sensitive area 21 may be set in a middle area of the touch display screen of the tablet computer or mobile phone. Since when the user operates the touch panel of the notebook computer or the touch display screen of the tablet computer and so on, the user is always accustomed to starting an operation from the middle position, therefore, the setting of this embodiment is more tallied to the using habit of the user, it is more convenient for the user to use. Of course, in an alternative embodiment, the second touch-sensitive area 22 and the first touch-sensitive area 21 may be arranged in parallel, that is, the second touch-sensitive area 22 is located at one side of the first touch-sensitive area 21; or the second touch-sensitive area 22 is surrounded by part of the first touch-sensitive area 21, and so on. The present application makes no limitation to the specific arrangement manner of the first touch-sensitive area 21 and the second touch-sensitive area 22, only it is ensured that the first touch-sensitive area 21 mentioned above is an area that an operator contacts first when a user of the electronic device uses the touch-sensitive area 2 to input the single input operation.

Figure 9:
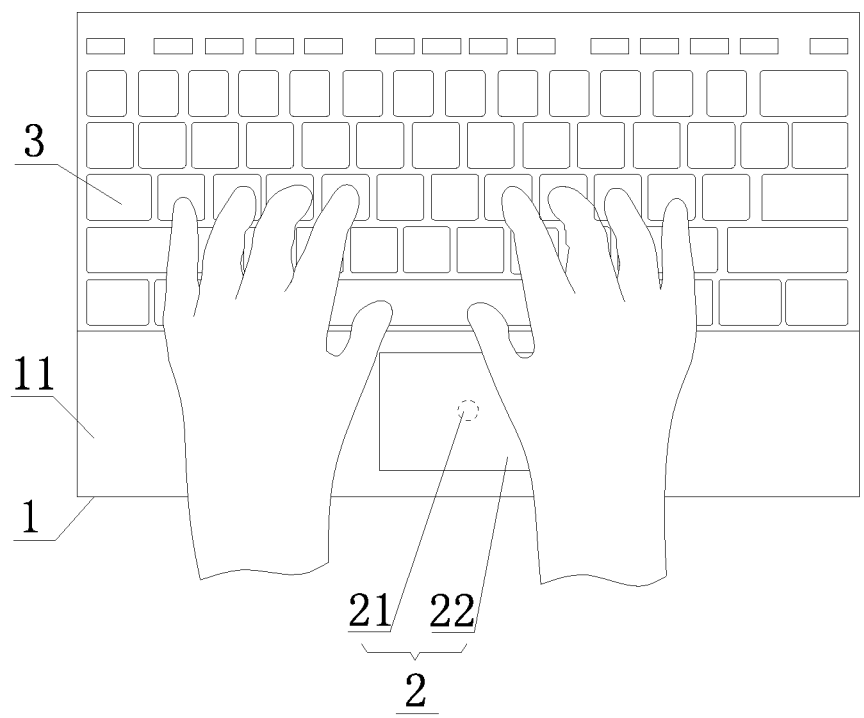
FIG. 9 is a structural schematic diagram when two hands operate a keyboard input area of the notebook computer provided by the second embodiment of the present application.

Based on the above description, as shown in FIGS. 5, 7, and 9, the electronic device provided by the second embodiment can further comprise a keyboard provided within the housing 1 and including a keyboard input area 3 that is exposed through a window of the housing 1. The keyboard input area 3 and the touch-sensitive area 2 are located on a same surface 11 of the housing, the keyboard input area 3 is located above the touch-sensitive area 2. For example, when the electronic device provided by the second embodiment is a notebook computer, as shown in FIG. 5, a display portion and a keyboard portion are rotatably connected via a rotating-connection member. The keyboard input area 3 is located at a side close to the rotating-connection member on the keyboard portion of the notebook computer, the touch-sensitive area 2 is located at a side away from the rotating-connection member on the keyboard portion of the notebook computer. In the second embodiment, as shown in FIG. 9, the first touch-sensitive area 21 in the touch sensitive area 2 mentioned above is when a user of the electronic device maintains a key input gesture and makes a key input in the keyboard input area 3, a non-contact area of the key input gesture, in other words, when the user makes a key input in the keyboard input area 3, the key input gesture of the user will not touch the first touch-sensitive area 21, in this way, it is possible to effectively avoid mistakenly touching the first touch-sensitive area 21. For example, when the electronic device in the second embodiment is a notebook computer, the first touch-sensitive area 21 may be set at a middle position of the touch area of the touch panel.

Based on the above description, in addition, as shown in FIG. 5, the electronic device provided by the second embodiment can further comprise a display screen 4; the processor mentioned above is further for generating a movement command for moving a cursor in real time according to an operation trajectory of the second input operation; and controlling movement of the cursor on the display screen 4 based on the movement command. Of course, in an alternative embodiment, the processor may be further for generating a scrolling command in real time according to an operation trajectory of the second input operation; and controlling a display list on the display screen 4 to scroll based on the scrolling command. As for the specific control method of the processor in the second embodiment, related description in the touch control method described above in the first embodiment may be referred, no more details repeated here.

Figure 10:
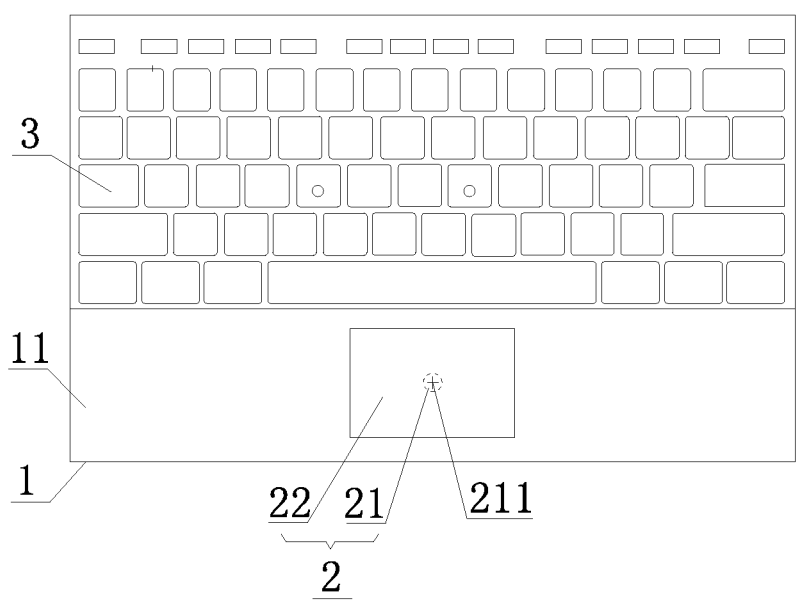
FIG. 10 is a partial structural schematic diagram of the notebook computer provided by the second embodiment of the present application.

In an implementation in particular, as shown in FIG. 10, a convex or groove 211 may be provided on the first touch-sensitive area 21, which bring the technical effect of facilitating user identifying. By means of the convex or groove 211 provided on the first touch-sensitive area 21, when the user operates the touch-sensitive area, it is possible to rapidly find the position of the first touch-sensitive area 21, which thereby facilitates user operating. In addition, by means of providing the convex or groove 211, surface of the first touch-sensitive area 21 is rough, which may enhance a touch sense when it contacts user's finger, and thereby enhances using experience of the user. In addition, as shown in FIG. 10, the convex or groove 211 mentioned above may be in a cross-shaped form for indicating user's operation. Of course, in an alternative embodiment, the convex or groove 211 may be not provided on the first touch-sensitive area 21, the first touch-sensitive area 21 may have a different vision or touch effect in comparison to the second touch-sensitive area, for example, the first touch-sensitive area 21 may have color, or when it is touched it is more smooth and so on, in this way, it can also achieve the technical effect of helping the user find the position of the first touch-sensitive area 21 rapidly.

By means of adopting the above technical solutions, the touch control method and electronic device of the present application at least have the following advantageous effects:

First, in the technical solutions provided by the embodiments of the present application, when the user does not need to operate the touch-sensitive area 2 of the electronic device, only the first touch-sensitive area 21 on the touch-sensitive area 2 is in the operating state, the second touch-sensitive area 22 on the touch-sensitive area 2 other than the first touch-sensitive area 21 is in the non-operating state, thereby energy is saved; and a proportion of the first touch-sensitive area 21 can be made as relatively small, thereby a probability that the user mistakenly operates the first touch-sensitive area 21 when operating the electronic device can be reduced.

Second, when the user needs to operate the touch-sensitive area 2 of the electronic device, the user only needs to regard the first touch-sensitive areas 21 as the starting position of an operating gesture, that is, it is possible to make the second touch-sensitive area 22 rapidly switch from the non-operating state to the operating state, the operating gesture of the user from the first touch-sensitive area 21 to the second touch-sensitive area 22 is a coherent action, which will not affect a normal input operation of the user, in comparison to the prior art, in which the user needs to operate the complicated key combination on the keyboard so as to open the touch-sensitive area 2 of the electronic device, in this embodiment, the user only needs to regard the first touch-sensitive area 21 as the starting position of the operating gesture, it is more convenient for the user to operate, operating efficiency is higher, and it tallies with using habit of the user, the user can have better using experience.

The above described are merely preferred embodiments of the present application, not limitations to the present application in any form, any simple modification, equivalent change or modification and so on made to the above embodiments based on the technical essence of the present application all fall into the scope of the technical solutions of the present application.

The invention claimed is:

1. A touch control method, comprising:
    obtaining a first input operation from a touch-sensitive area of an electronic device, wherein the touch sensitive area comprises a first touch sensitive area corresponding to a first portion of a touch sensor and a second touch-sensitive area corresponding to a second portion of the touch sensor, and when the second portion of the touch-sensitive area is in a non-operating state, the first portion of the touch-sensitive area is in a working state;
    determining whether a first operating trajectory of the first input operation starts within the first touch-sensitive area;
        in response to a determination that the start of the first operating trajectory of the first input operation starts within the first touch-sensitive area, controlling the second portion of the touch sensor to switch from a first state to a second state, the second state being an operating state;
        obtaining a second input operation through the second touch-sensitive area in the second state, wherein a second operating trajectory of the second input operation and the first operating trajectory of the first input operation is coherent;
    in response to the second input operation, generating an operation instruction corresponding to the second input operation, wherein the operation instruction comprises an image movement on a display screen of the electronic device in real time according to the second operation trajectory of the second input operation in response to the second input operation,
    wherein, when a display screen of the electronic device is unlighted, the first portion of the touch sensor is in the second state and the second portion of the touch sensor is in the first state and when the second portion of the touch sensor is switched from the first state to the second state, controlling the first portion of the touch sensor to switch from the second state to the first state.

2. The touch control method as claimed in claim 1, wherein
    obtaining the first input operation from the touch-sensitive area of the electronic device comprises when the first portion of a touch sensing array of a touch sensor of the electronic device is in an operating state and a second portion thereof is in the first state, obtaining the first input operation through the first portion of the touch sensing array of the touch sensor in the operating state; the first touch-sensitive area and the second touch-sensitive area are corresponding to the touch sensing array of the touch sensor, the first touch-sensitive area corresponding to the first portion of the touch sensing array, the second touch-sensitive area corresponding to the second portion of the touch sensing array; and
    controlling the second touch-sensitive area of the electronic device to switch from the first state to the second state comprises controlling the second portion of the touch sensing array of the touch sensor to switch from the first state to the second state.

3. The touch control method as claimed in claim 2, wherein the first input operation and the second input operation are different input portions of a single input operation.

4. The touch control method as claimed in claim 3, wherein the first touch-sensitive area is an area first contacted by an operator when inputting the single input operation.

5. The touch control method as claimed in claim 4, wherein:
    generating the operation instruction corresponding to the second input operation comprises:
    generating a movement command for moving a cursor on a display screen of the electronic device in real time according to an operation trajectory of the second input operation; and
    controlling movement of the cursor on the display screen based on the movement command.

6. The touch control method as claimed in claim 1, wherein:
    obtaining the first input operation from the touch-sensitive area of the electronic device comprises when a first sensor of the electronic device is in an operating state and the touch sensor of the electronic device is in the first state, obtaining the first input operation by the first sensor; the first touch-sensitive area corresponding to a sensitive area of the first sensor, and the second touch-sensitive area corresponding to a sensitive area of the touch sensor; and controlling the second touch-sensitive area of the electronic device to switch from the first state to the second state comprises controlling the touch sensor to switch from the first state to the second state, and controlling the first sensor to switch from the operating state to the non-operating state.

7. An electronic device, comprising:
a housing having a touch-sensitive area for touch input;
a display screen; and
a processor configured to:
obtain a first input operation from a touch-sensitive area of the touch-sensitive area, wherein the touch sensitive area comprises a touch sensitive area corresponding to a first portion of a touch sensor and a second touch-sensitive area corresponding to a second portion of the touch sensor, and when the second portion of the touch-sensitive area is in a non-operating state, the first portion of the touch-sensitive area is in a working state;
determining whether an first operating trajectory of the first input operation starts within the touch-sensitive area;
in response to a determination that the start of the first operating trajectory of the first input operation starts within the touch-sensitive area,
control the second portion of the touch sensor to switch from a first state to a second state;
obtain a second input operation through the second touch-sensitive area in the second state, wherein a second operating trajectory of the second input operation and the first operating trajectory of the first input operation is coherent; and
in response to the second input operation, generate an operation instruction corresponding to the second input operation;
wherein, when a display screen of the electronic device is unlighted, the first portion of the touch sensor is in the second state and the second portion of the touch sensor is in the first state and when the second portion of the touch sensor is switched from the first state to the second state, the first portion of the touch sensor is switched from the second state to the first state.

8. The electronic device as claimed in claim 7, further comprising:
a touch sensor having a touch sensing array; wherein the touch sensing array is corresponding to the touch-sensitive area of the housing; the touch-sensitive area is corresponding to a first portion of the touch sensing array, and the second touch-sensitive area is corresponding to a second portion of the touch sensing array;
wherein the processor is coupled with the touch sensor, the processor is further configured to:
obtain the first input operation through the first portion of the touch sensing array of the touch sensor, when the first portion of the touch sensing array is in an operating state and the second portion thereof is in the first state; and
control the second portion of the touch sensing array to switch from the first state to the second state in response to the first input operation.

9. The electronic device as claimed in claim 8, wherein the second touch-sensitive area surrounds the touch-sensitive area.

10. The electronic device as claimed in claim 9, further comprising a keyboard having a keyboard input area, the keyboard input area and the touch-sensitive area being located on a same surface of the housing.

11. The electronic device as claimed in claim 10, wherein the touch-sensitive area of the touch sensitive area is an area not contacted by an input gesture during inputting through the keyboard input area.

12. The electronic device as claimed in claim 9, wherein the processor is further configured to:
generate a movement command for moving a cursor in real time according to an operation trajectory of the second input operation; and
control movement of the cursor on the display screen based on the movement command.

13. The electronic device as claimed in claim 7, further comprising:
a first sensor having a sensing area corresponding to the touch-sensitive area;
a second touch sensor having a sensing area corresponding to the second touch-sensitive area;
wherein the processor is coupled with the first sensor and the second touch sensor, the processor is further configured to:
obtain the first input operation by the first sensor, when the first sensor is in an operating state and the second touch sensor is in the first state;
control the second touch sensor to switch from the first state to the second state; and
control the first sensor to switch from the operating state to the non-operating state.

* * * * *